May 16, 1967 D. M. SPEROS ET AL 3,319,456
QUANTITATIVE DIFFERENTIAL THERMAL ANALYSIS APPARATUS
Filed Feb. 7, 1964 2 Sheets-Sheet 1
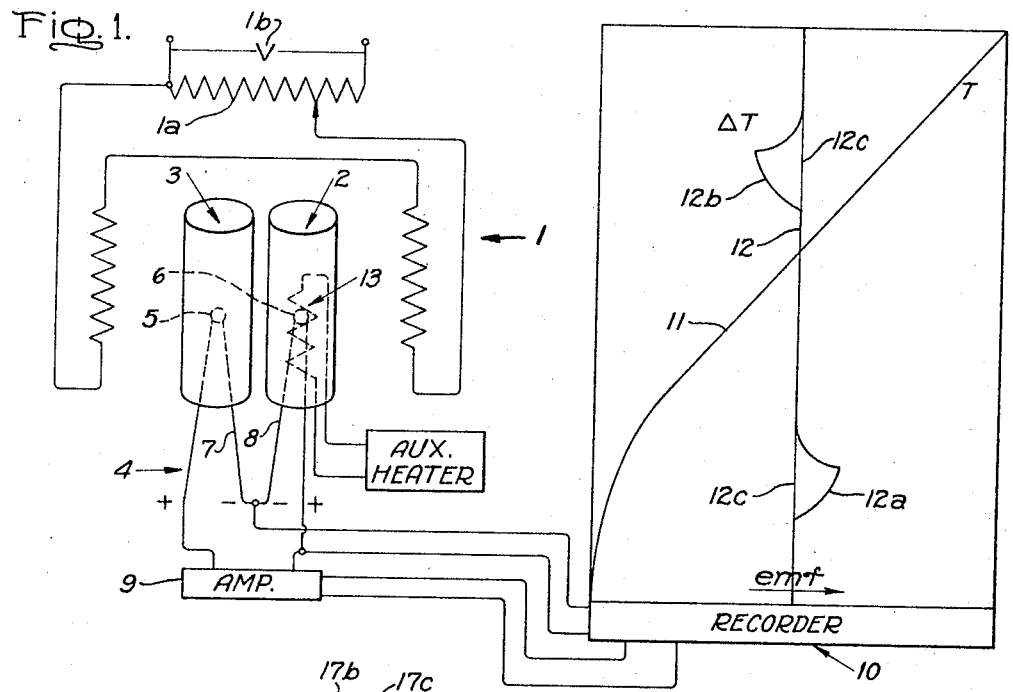
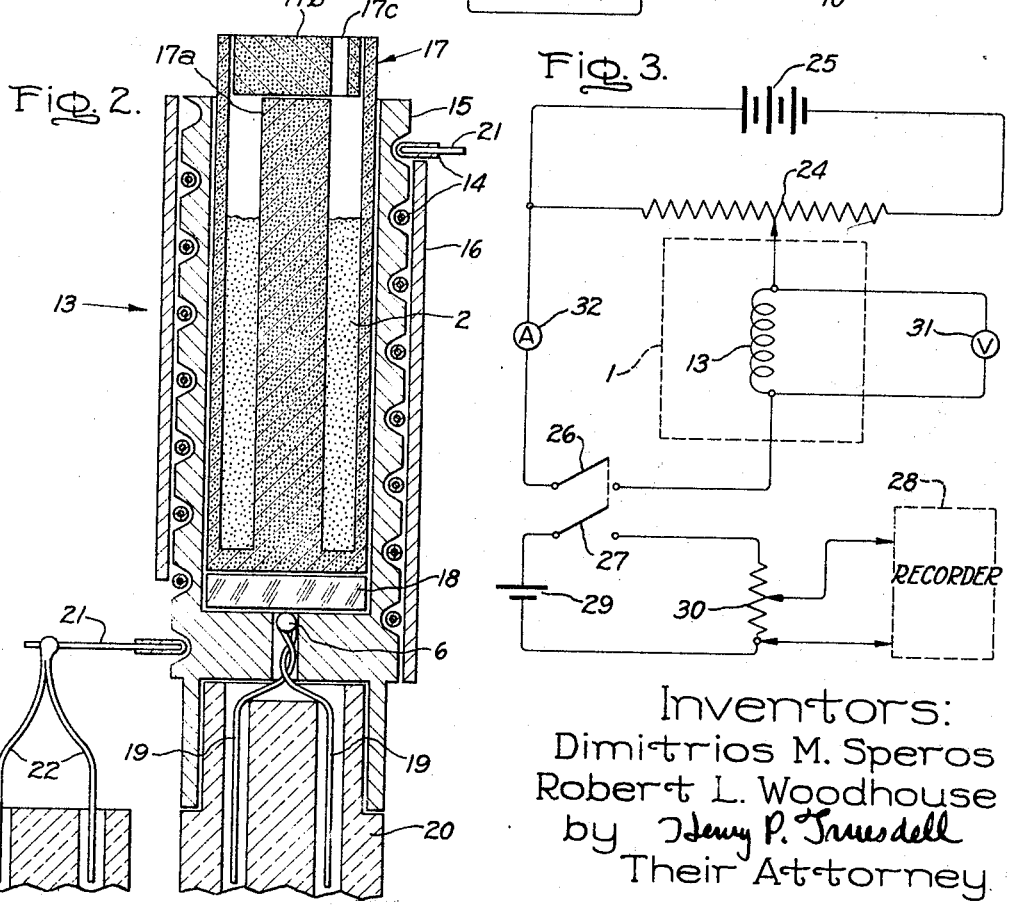
Inventors:
Dimitrios M. Speros
Robert L. Woodhouse
by Henry P. Truesdell
Their Attorney May 16, 1967  D. M. SPEROS ET AL  3,319,456
QUANTITATIVE DIFFERENTIAL THERMAL ANALYSIS APPARATUS
Filed Feb. 7, 1964  2 Sheets-Sheet 2

Inventors:
Dimitrios M. Speros
Robert L. Woodhouse
by Henry P. Truesdell
Their Attorney

United States Patent Office 3,319,456
Patented May 16, 1967

3,319,456
**QUANTITATIVE DIFFERENTIAL THERMAL
ANALYSIS APPARATUS**
Dimitrios M. Speros, Painesville, and Robert L. Woodhouse, Cleveland Heights, Ohio, assignors to General Electric Company, a corporation of New York
Filed Feb. 7, 1964, Ser. No. 343,389
7 Claims. (Cl. 73—15)

This invention relates to apparatus and a method of the differential-thermal-analysis type for quantitatively determining thermodynamic data, kinetic data, and both thermodynamic and kinetic data for materials, and to an article of manufacture useful in such apparatus and method. More specifically, the invention relates to such an apparatus and method for determining the change in heat content of a sample ($\Delta H$) and the rate of change ($dH/dt$) as a function of time.

The method of differential thermal analysis has been used extensively for many years for the qualitative study of processes involving changes in heat content ($\Delta H$). Classical differential thermal analysis involves the heating or cooling of a sample material and a thermally inert reference material at a constant rate in an external furnace. The junctions of a differential thermocouple are embedded in or located near the sample and reference materials. A differential thermocouple is a thermocouple consisting of two thermocouples with one leg of one of the thermocouples electrically joined to the leg of like polarity of the other thermocouple. When the two thermocouples are at the same temperature, the voltages (electromotive force or E.M.F.) generated in the two thermocouples will cancel each other, leaving the E.M.F. of the differential thermocouple at zero. However, an endothermic process in the sample will absorb heat, lowering the sample temperature relative to that of the reference and thereby generating an E.M.F. in the differential thermocouple. An exothermic process will raise the temperature of the sample and generate an E.M.F. of polarity opposite to that of an endothermic process. Exothermic and endothermic processes that occur in a sample material as the furnace temperature is varied at a uniform rate are recorded by use of the differential thermocouple E.M.F. as deviations from a base line and appear as peaks on one side or the other of the base line. Such methods, in the past, have yielded information on the following:

(1) Temperature range in which a thermal change takes place;
(2) The net exothermic or endothermic nature of the change;
(3) A very approximate and relative indication of the magnitude of the change in heat content—hereafter designated $\Delta H$.

The approximate nature of the indicated $\Delta H$ is due to the complexity of the relationships between $\Delta H$ and the height and area of the recorded peaks. The relationship depends on many factors including the specific heats of the sample and of the system, the speed of the reaction, the heating rate of the external furnace, and sample geometry among others. The classical methods can therefore be described as qualitative.

The reduction of differential thermal analysis to a firm quantitative basis whereby $\Delta H$ could be determined with an accuracy in the vicinity of 1% has appeared to have such potential usefulness that numerous attempts have been made to bring it about. However, none of the previous attempts have been fully satisfactory. The previous attempts can be classified as computation methods and calibration methods. A number of the computation methods are highly developed, but they employ quite complex computations and, in essence, attempt to accomplish what in classical calorimetry would be akin to computing the energy equivalent of a calorimeter. Calibration techniques used in the past have met with very limited success either because they involve calibrations peculiar to each set of substances and set of conditions, or because the principle of thermal balance, an important factor in the present invention, has not been taken fully into account.

Accordingly, it is an object of the present invention to provide an apparatus capable of quantitatively determining thermodynamic, thermokinetic (herein referred to as kinetic), or thermodynamic and kinetic information for materials by differential-thermal-analysis means.

Another object is to provide apparatus capable of determining $\Delta H$ and $dH/dt$ as a function of time for materials by such means.

Still another object of the invention is to accomplish the above objects with an apparatus which can be calibrated to give correct thermodynamic information with respect to one substance of known thermodynamic properties at the temperature of a specific enthalpic process and then be usable without further calibration for determining similar information for other known or unknown materials at the same or different temperatures within a broad temperature range.

It is also an object to provide a method for quantitative differential thermal analysis which can be performed on various types of apparatus, and in part by hand, provided that certain limitations of the method are adhered to.

A further object of the invention is to provide, as an article of manufacture, a sample heater, heat barrier, and thermocouple structure particularly suited for use in the apparatus and the method of the invention.

It is another object of the invention to provide apparatus and a method suitable for determining for substances kinetic information of a nature and in a manner not heretofore feasible.

In the drawings:

FIG. 1 is a schematic diagram of the essential parts of an apparatus suited for differential thermal analysis including a schematic representation of certain features of the invention.

FIG. 2 is a vertical section of certain features of the apparatus of the invention in proximity to the sample material and comprising the article of manufacture of the invention.

FIG. 3 is a partial schematic diagram of an embodiment of a manual control system for an auxiliary heater employed in the invention.

Figure 4:
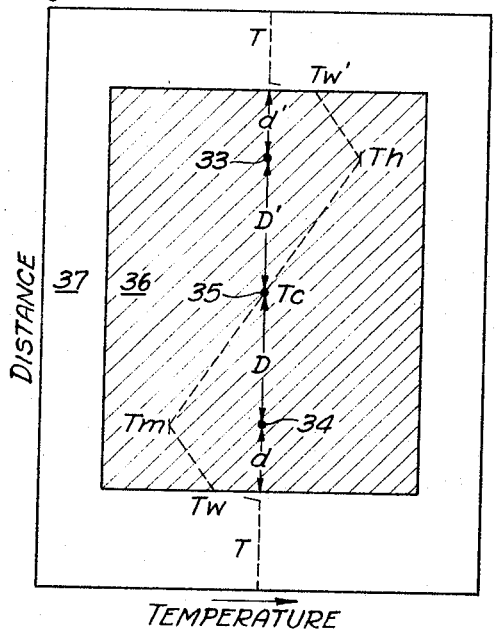
FIG. 4 is a graphic representation of the concept of thermal balance within an imaginary sample structure according to the invention.

Briefly stated, the present invention provides an apparatus, a method, and an article of manufacture for the quantitative determination of thermodynamic and kinetic information for sample materials by means of differential thermal analysis in which the rate at which energy is added to the sample material is increased or decreased while the sample material is undergoing an endothermic or exothermic process so as to cancel out the thermal effect of the process. Measurements of the rate at which energy is added and of the total amount permit calculation of $\Delta H$ and $dH/dt$. For general application with accuracy it is necessary that two factors be constantly in operation. First, a temperature balance must be maintained between the reference material or means and the sample material. Second, a thermal balance must be maintained between (a) the auxiliary heater which supplies energy to the sample material at a rate which is varied during thermodynamic processes, (b) the sample thermocouple responsive to the temperature of the sample material, and (c) the sample material itself. Such thermal balance is a fundamental criterion for accuracy from sample to sample and over a broad temperature range. Thermal balance may be obtained according to the teachings of the present invention by the interposition of a heat barrier of a thickness calibrated to give correct results on a known substance between the sample thermocouple and the sample material. The purpose of the thermal barrier is to establish a constant relation between the heat loss from the auxiliary heater, the heat gain to the sample material, and the temperature measured by the thermocouple.

The present invention also constitutes an improvement in apparatus suited for differential thermal analysis.

Apparatus for differential thermal analysis as illustrated in FIG. 1, comprises an external heater or furnace 1 suited for heating a sample material 2 and a reference material 3 which is thermally inert, i.e., does not undergo any significant exothermic or endothermic processes in the temperature range being investigated. The heating rate of th furnace 1 can be controlled by a rheostat 1a varying the input from voltage source 1b. The reference material 2 and sample material 3 are both heated by the external furnace 1 in quantitatively constant relation. This means that there is a constant relation between the temperature of the same material and that of the reference material so long as both are thermally inert. This requirement can be met preferably by maintaining a constant temperature differential between the two materials, or by maintaining the two materials at the same temperature, or by maintaining a constant proportion or ratio between the temperatures of the two materials.

The junctions 5, 6 of a differential thermocouple 4 are embedded in or located near the sample and reference materials so that the junctions are responsive to the temperatures of the respective materials. The differential thermocouple 4 comprises two thermocouples 5, 6 with a leg 7 of one thermocouple electrically connected to a leg 8 of like polarity of the other thermocouple. When the two materials are at the same temperature no voltage will be generated in the differential thermocouple.

Actually, temperature sensing means other than thermocouples can be used. As an example, resistance thermometers can be used for the same purpose.

The E.M.F. developed by the differential thermocouple is amplified by an amplifier 9 and continuously displayed on a recorder 10. When desirable, the actual temperature of the reference material or the sample material can be recorded as at 11 in conjunction with the E.M.F. of the differential thermocouple, shown at 12. Exothermic or endothermic processes that occur in the sample as the furnace temperature is raised are recorded as deviations from a base line in the output of the differential thermocouple and appear as peaks on one side or the other of the base line. An exothermic process is represented at 12a and an endothermic process at 12b. In the drawing, base lines 12c have been drawn under the peaks to illustrate the departure from the base line caused by the processes. On the recorder shown in FIG. 1, E.M.F. increases to the right.

The apparatus of the invention, in addition to the above described classical differential-thermal-analysis equipment, involves provisions for eliminating the peaks 12a, 12b associated with exothermic and endothermic processes in the sample material and for measuring the variation in energy supplied to the sample material by an auxiliary heater 13 during such process to keep the temperature of the sample material equivalent to that of the reference material during the process. The required energy supply to the auxiliary heater 13 is determined and controlled by feedback means responsive to the enthalpic processes experienced by the sample. The invention also involves a provision for maintaining the heat loss from the auxiliary heater 13 equivalent to the heat gain by the sample material. The invention further provides for maintaining the rate of heat loss from the auxiliary heater 13 equivalent to the rate of heat gain by the sample material 2. The word equivalent is used herein to indicate a constancy of relation such as of temperature or heat gain or loss, particularly before, during and after a thermodynamic process in the sample. The necessity for maintaining a thermal balance between the sample and the auxiliary heater in order to obtain accurate results is demonstrated by the reasons discussed below which, to our knowledge, have not previously been investigated for application to quantitative differential thermal analysis.

With reference to FIG. 2, according to one embodiment of the invention, auxiliary heater 13 is provided consisting of a ceramic insulated wire 14 which may be spirally wound on a generally cylindrical hollow mandrel 15, which may be made of a metal such as nickel, and encased in a sleeve 16 enclosing the sample 2 which may be held within a container 17. The auxiliary heater may be provided with various types and shapes of cavities, such, for example, as those shown in FIG. 2, for the positioning and enclosing of the sample container 17, heat barrier 18, and thermocouple 6. The container may preferably be provided with a centerpost 17a which will cause the sample material to be disposed in the form of a relatively thin annulus about the centerpost, and a lid 17b which may preferably be perforated by a passageway 17c to allow for evacuation of gases from the sample before heating and for the escape of any gases that may be evolved by the sample material during heating. The sample thermocouple 6 of the differential thermocouple is positioned within the auxiliary heater 13 beneath the sample container 17 and on the opposite side of a heat barrier 18 from the sample container. The thermocouple wires 19 may be brought into position through an insulator 20 which may also serve as a support for the auxiliary heater 13. One of the current inleads 21 to the auxiliary heater 13 may be connected to an ammeter and a voltmeter by two wires 22 which in turn, are fed to the heater through another insulator 23.

One alternative embodiment of the invention provides an essentially spherical auxiliary heater surrounding the sample material and also containing the sample thermocouple.

The schematic circuit diagram of FIG. 3 illustrates a hand-operated means for supplying electrical energy to the auxiliary heater 13 for the purpose of counter-balancing exothermic and endothermic processes in the sample material. An operator is able to monitor a recorder displaying the voltage output of the differential thermocouple to determine when such a thermodynamic process begins to occur. At that time, if the process is endothermic, the operator can, by closing switch 26, energize the auxiliary heater 13, regulated by rheostat 24 powered by battery 25 and operating on a sample material within the main furnace indicated by dashed lines at 1. The closing of switch 26 also operates to close switch 27 which in turn activates a second recorder 28. Recorder 28, energized by battery 29 and controlled by rheostat 30, records the instantaneous and total time during which the auxiliary heater 13 operates. Voltmeter 31 and ammeter 32 act in cooperation to provide information on the rate of energy utilization in auxiliary heater 13. It is readily apparent to one skilled in the art that the functions of the circuits of FIG. 3 can be fulfilled by various different types of automatic instruments and equipment. By way of example, rather than visual observation of the thermodynamic process by monitoring the E.M.F. output of the differential thermocouple 4 on recorder 10, such output can be used as a feedback signal to cause the opening and closing of a switching device such as switch 26 for energization of the auxiliary heater 13. Alternatively and preferably, such control can be provided continuously on either a continuously variable or an intermittent basis with the feedback signal causing more or less energy to go through the auxiliary heater rather than merely turning it off or on.

In order to accommodate both exothermic and endothermic phenomena, it is necessary for the auxiliary heater to continually supply a certain rate of energy input to the sample material. During endothermic processes, the rate of energy input through the auxiliary heater is increased to maintain the sample material in quantitatively constant temperature relation to the reference material. During exothermic processes, the rate of energy input to the sample material is decreased to again cancel out the effect of the process on the temperature rise of the sample material. By such means, a temperature balance is maintained between the sample and reference thermocouples. In order to accomplish this temperature balance, an amount of electrical energy $\Delta Q$ must be expended. $\Delta Q$ is related to $\Delta H$, which is the amount of heat absorbed or released by the thermodynamic process. However, $\Delta Q$ will equal $\Delta H$ only fortuitously unless the rate of heat gain or loss from or to the surroundings is made the same during the process as it was before the process began. Such a relationship of heat gain to heat loss is herein referred to as thermal balance. Therefore, if the conditions are properly met, the recorded value of $\Delta Q$ will equal $\Delta H$. Moreover, further useful information can be obtained by supplying and recording the energy input to the auxiliary heater on an instantaneous basis, thereby obtaining $dQ/dt$ as a function of time which, if the criterion are properly controlled, can be equated to $dH/dt$ as a function of time.

To illustrate for more ready understanding what is entailed in the concept of thermal balance, we have proposed a theoretical model hereinafter described. From this model, the equivalence of various types of apparatus, methods and articles of manufacture to the embodiments specifically disclosed as examples of the invention can be more readily determined. Furthermore, the relationships discussed in conjunction with the theory will give a more distinct definition to some of the terminology used to define the scope of the invention.

The arrangement of FIG. 4 represents, in one dimensional form, a heat source or heater 33, corresponding to the auxiliary heater 13 of FIG. 2, heat sink or sample 34, and a thermocouple 35 embedded in a solid 36 which is immersed in a gas 37. By way of example, the model will be discussed with reference to a sample 34 undergoing fusion. Fusion or melting has been chosen for the analysis since it is generally a zero-order reaction, thereby simplifying the mathematical concepts involved. It should be understood that the invention is equally applicable to other enthalpic or thermodynamic processes such as phase changes, vaporization and dehydration, among others.

The rate of heat loss from the heater will be given by $$\frac{dQ}{dt} = k(T_h - T_m) + \frac{dL}{dt} \quad (1)$$

where $T_m$ is the melting point (sample temperature), $T_h$ is the heater temperature, and $dL/dt$ is the rate of heat loss to the gaseous atmosphere.

The rate of heat absorption by the sample will be given by $$\frac{dH}{dt} = k(T_h - T_m) + \frac{dG}{dt} \quad (2)$$

where $dG/dt$ is the rate of heat gain from the atmosphere.

For thermal balance, i.e., for equality between Equations 1 and 2, the following condition must be satisfied $$\frac{dG}{dt} = \frac{dL}{dt} \quad (3)$$

The appropriate relationships of heat transfer, as described by W. H. McAdams, in "Heat Transmission," McGraw-Hill Book Co., New York, N.Y., 1942, p. 22, are $$\frac{dG}{dt} = \frac{T - T_w}{R} = \frac{T_w - T_m}{rd}$$

$$\frac{dL}{dt} = \frac{T_w' - T}{R'} = \frac{T_h - T_w'}{r'd'}$$

where $T$ is the gas temperature, $T_w$ and $T_w'$ are the wall temperatures at the sample and heater sides of the solid, respectively, $d$ and $d'$ are distances of sample and heater, respectively, from the adjacent walls of the solid, $R$ and $R'$ are heat resistance constants related to heat transmission at the boundary between the gas and solid, and pertain to the sample and the heater respectively, and $r$ and $r'$ are the respective heat resistance constants related to heat transmission through the solid. In all cases in this analysis, a primed letter refers to a parameter related to the heat source or heater 33 while an unprimed letter refers to a parameter related to the heat sink or sample 34.

The preceding relations yield $$\frac{dG}{dt} = \frac{T - T_m}{R + rd}$$

$$\frac{dL}{dt} = \frac{T_h - T}{R' + r'd'}$$

Therefore for the condition expressed by Equation 3 to exist, we must have $$\frac{T - T_m}{T_h - T} = \frac{R + rd}{R' + r'd'} = \Delta \quad (4)$$

We now consider the condition of compatibility between Equation 4 and the temperature balance condition, namely that the thermocouple temperature $T_c = T$, the gas temperature. The thermal currents to and from the thermocouple at steady state must be equal, i.e., $$\frac{T_h - T_c}{r'D'} = \frac{T_c - T_m}{rD}$$

where $D$ and $D'$ are distances from sample to thermocouple and heater to thermocouple, respectively, and $T_c$ is the temperature of the thermocouple. Since, for temperature balance, $T_c = T$, the above expression may be written $$\frac{T - T_m}{T_h - T} = \frac{rD}{r'D'} = \Delta \quad (5)$$

where $\Delta$ has already been defined by Equation 4.

In the case of a homogeneous solid, $r = r'$, and $$\Delta = \frac{D}{D'} \quad (6)$$

When an exothermic process is anticipated, a constant power input is applied to the heater 33. This results in a constant difference between $T_c$ and $T$. By appropriately reducing this input to the heater during the exothermic process, this temperature difference is maintained constant. In an arrangement in which the sample and the sample thermocouple of the differential thermocouple are enclosed in an auxiliary heater, such, for example, as shown in FIG. 2, if the temperature difference between the heater surface and the surroundings is always kept constant, then for the entire system $dG/dt$ and $dL/dt$ will be constant, regardless of what the sample is doing. As a result, the rate of heat loss to the surroundings from the entire structure before, during and after the process is held constant and the concepts of both temperature balance and thermal balance still apply.

Equations 4 and 5 indicate that, even for the idealized model of FIG. 4, the requirements for equality between electrical and process energies are rigorous. This imposes strict conditions on the relative placement of sample heater and thermocouple. If, for example, $rD/r'D'$ is not equal to $\Delta$, then $\Delta Q$ is not equal to $\Delta H$ even if the temperature balance is maintained. However, these equations indicate that, in principle, it is possible to adjust or balance the sample structure until $dG/dt=dL/dt$ by varying the parameters $d$, $d'$, $D$, and $D'$ and, if necessary $R$, $R'$, $r$, and $r'$. The alternative of operating with a known $$(dG/dt)-(dL/dt)=0$$

found by calibration is, as will be seen, normally unnecessary, although it is also within the contemplation of the invention.

FIG. 4 is also provided with a dashed line representing the relative temperatures at different locations in the theoretical structure. The dashed line is related to the abscissa in that it represents increasing temperature going toward the right of the figure. The ordinate represents distance, in dimensionless terms, through the theoretical structure. The temperature and distance notations accompanying the dashed line correspond to those defined in the above analysis.

A practical embodiment that satisfies or approximates the invention as generally described above, particularly by Equations 4 and 5, may possibly take any one of a number of forms. One preferred embodiment which has been described above is illustrated in FIG. 2. This approach can be viewed as a wrapping of the arrangement of FIG. 4 about itself in the sense of surrounding the sample by the heater as shown in FIG. 2. For an endothermic process, the temperature of the heater is kept at T, the temperature of the gas, as determined by comparison with the temperature of the reference thermocouple (not shown in FIG. 2) or made to oscillate equally above and below T, so that for the entire structure the integral of $dG$ approximates the integral of $dL$ which also approximates 0. For an exothermic process, the surface temperature of the sample is maintained at a temperature T' higher than T, or made to oscillate equally above and below T', so that for the entire structure $dL/dt$ is constant before, during, and after the process.

Such a temperature balance is maintained by one of two methods. The first is manual switching of the heater on and off at constant power, the duration of each pulse being such (usually more than 1 second) that $T_c$ oscillates equally above and below T (or T'). The second is continuous adjustment of the power either manually or automatically by use of an electronic control circuit. By means of manual switching, we have been able to hold the oscillation amplitude below 0.03° C. The total time during which the auxiliary heater is energized can be found by means of a stop watch or another recorder. The rate of energy input to the heater and the time of operation of the heater can be used to determine the total energy input to the heater. For instantaneous kinetic determinations, it is preferable to use a continuous control system.

The distance beween the thermocouple and the sample container, or the thermal equivalent of such distance as in the concept conveyed by Equation 5, is adjusted until the correct heat of fusion of a substance such as Pb, having known thermodynamic characteristics, is obtained. In order to have a compact design, this thermal equivalent distance may be increased, not only by placing the sample far from the thermocouple, but preferably by inserting a wafer of a material such as quartz of a small finite thickness between the thermocouple and sample. This wafer is represented in the heat barrier shown at 18 in FIG. 3. In calibrating the apparatus for Pb, we have introduced a wafer of quartz 1.5 mm. in thickness to obtain an accuracy within 1% of the accepted values. The significance of Equation 5 is illustrated by the fact that when no heat barrier material at all was used, the error was found to be plus 2%; when the thermocouple was in direct contact with the sample container, but not with the heater casing, the error amounted to $+10\%$ or more depending on the intimacy of the contact; when the thickness of the quartz was increased, the error became negative, amounting to $-8\%$ for a quartz thickness of 10 mm.

Complete lack of electrical interference between the thermocouple circuit and the heater circuit is, of course, quite preferable. Conductance through the heater insulation, for example, can cause effects varying from intermittent noise to results faulty by several percent. By use of the apparatus and techniques herein described, we have found that a single calibration of the thickness of the quartz wafer on one material of known thermodynamic properties permits the apparatus to be used accurately on other materials in general over a broad temperature range. The limits of the useful temperature range depend mainly on the materials of construction and the range of thermal inertness of the reference means.

As is known in the art, the reference material basically provides a means for biasing the output of the differential thermocouple to zero or to a constant value while the sample is thermally inert. Other means such as the use of a potentiometer or electronic compensating means can also fulfill the function. In the present applications, the purpose of the reference means is to supply a base line from which $\Delta H$ and $dH/dt$ can be calculated. In some few instances, the recording system itself can serve as its own reference means as, for instance, when the E.M.F. output of the sample thermocouple increases constantly with time while the sample is inert, so that a straight line can be drawn as the true base line from before the enthalpic process began until after it ended. However, for practical purposes, and for flexibility of application, it is necessary to have a reference means responsive to the temperature of the external furnace, and preferably one, such as a differential thermocouple, which both increases in temperature with the steady increase in temperature of the sample and also cancels out any non-linearity with respect to temperature in the E.M.F. output of the sample thermocouple. Accordingly, the optimum reference means is a differential thermocouple consisting of two like thermocouples cooperatively responsive to the temperature differences between the sample and a thermally inert reference material. Reference means can also be provided in various forms depending on the temperature range to be investigated. Reference means can be built into the equipment by providing a permanent reference material or can be provided by adding a suitable reference material to a container for the material which is built into the equipment. Furthermore, reference means can be provided in the form of a variable electrical biasing means of any of several types.

By way of example, once the sample structure was balanced using Pb, the correct heats of fusion were obtained without further adjustment of the sample structure for Sn, $NaNO_3$, Al, and Ag, thus covering a useful range of temperature. Table I presents data on the determinations of heats of fusion which we obtained during the testing, along with values taken from the literature. Values from O. Kubaschewski and E. L. Evans are from their book, "Metallurgical Thermochemistry," Pergamon Press, New York, N.Y., 1958. Values from K. K. Kelley are published in U.S. Bureau of Mines Bulletin 584, U.S. Government Printing Office, Washington, D.C., 1960.

These two sets of data can presently be considered to be representative of the most reliable or "best" data in literature. The external furnace provided heating rates between 0.01 and 0.50° C. per minute. The furnace was operated with the internal atmosphere being purified argon gas in a range of pressure from 378 to 1010 mm. Hg, and the range of values under the normal (uncompensated) differential-thermal-analysis peaks was from 0.8 to 1.5 cm.²/joule. The shape of the sample container was varied and included both an open cylinder and a cylinder with a center post.

Kinetically, fusion is generally a zero-order rate process described by $$\frac{dn}{dt} = \frac{1}{\Delta H_o} \frac{dH}{dt}$$

where $\Delta H_o$=heat of fusion (calories/mole), $n$=moles of molten substance and $dH/dt$ is the rate at which heat energy is actually absorbed by the substance. Also, $$\frac{dn}{dt} = 2\frac{\Delta H}{\Delta H_o} \frac{t}{t_o^2} = \left(\frac{2\Delta H}{\Delta H_o t_o^2}\right) t = \frac{2n}{t_o^2} t$$

TABLE I.—DETERMINATION OF HEATS OF FUSION AND COMPARISON WITH LITERATURE VALUES

| Sample and Sample Container(s)* | Fusion Temp., °C. | Range of Sample Mass, g. | Range of Auxiliary Heater Input | | Mean ΔH fusion and Range, cal./mole | "Best" Critical Values | |
|---|---|---|---|---|---|---|---|
| | | | Watts | Seconds | | Kubaschewski and Evans | Kelley |
| Sn (a) | 231.8 | .3411–.7671 | .0563–.1964 | 234.5–628.8 | 1,693 (1,686–1,702) | 1,690± 30 | 1,720 |
| NaNO₃ (c) | 306.0 | .1861–.2105 | .1196–.1879 | 193.5–270.4 | 3,549 (3,492–3,575) |  | 3,490 |
| Pb (a) (b) | 327.4 | .9673–1.2783 | .0759–.2303 | 127.7–293.5 | 1,135 (1,129–1,140) | 1,150± 30 | 1,140 |
| Al (a) | 658.8 | .0964–.2165 | .1268–.2102 | 182.2–637.0 | 2,566 (2,552–2,582) | 2,500± 30 | 2,570 |
| Ag (a) | 960.8 | .4414–.7535 | .2484–.5229 | 145.1–268.0 | 2,728 (2,595–2,867) | 2,690±100 | 2,855 |

*(a) Spectroscopically pure graphite; (b) #446 stainless steel; (c) 99.999% pure Ag.

Table I shows that the agreement between the results of the present work and the critical values of the literature is as good as the agreement among the critical values themselves.

The materials for the containers used for holding the sample were chosen to minimize reaction between sample and container and to avoid contamination of the sample. The samples were handled with meticulous techniques and provided in various forms as described in further detail in our article in the Journal of Physical Chemistry, volume 67, pages 2164–2168 (October 1963).

Figure 5:
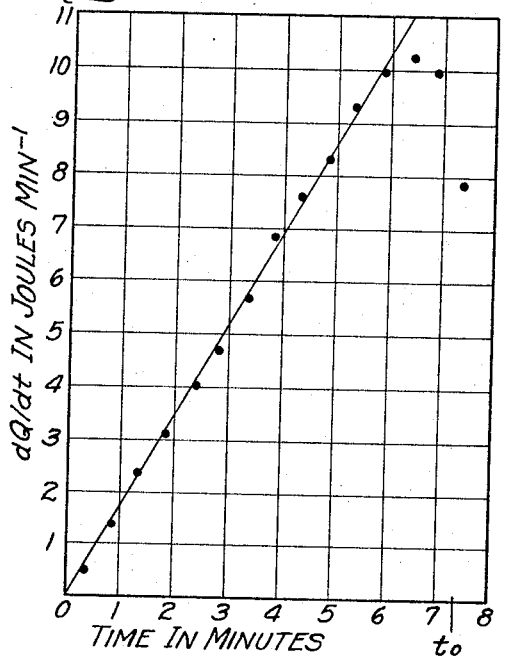
FIG. 5 is a graphic representation of $dQ/dt$ (equivalent here to $dH/dt$) vs. time for the fusion of a sample of tin, embodying information obtained by the use of the invention.
Figure 6:
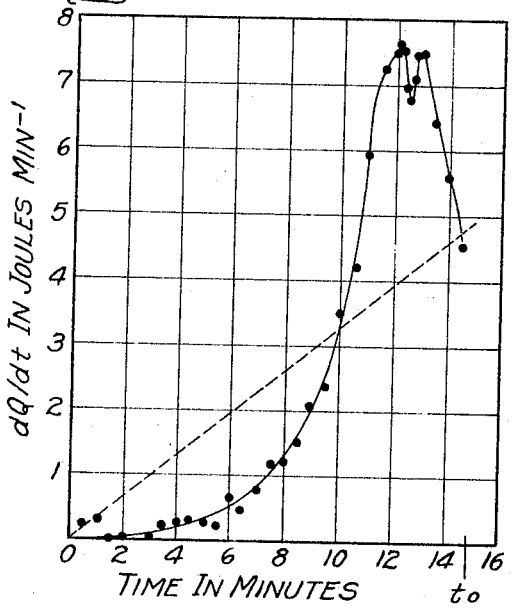
FIG. 6 is a representation similar to that of FIG. 5 but for the fusion of sodium nitrate.
Figure 7:
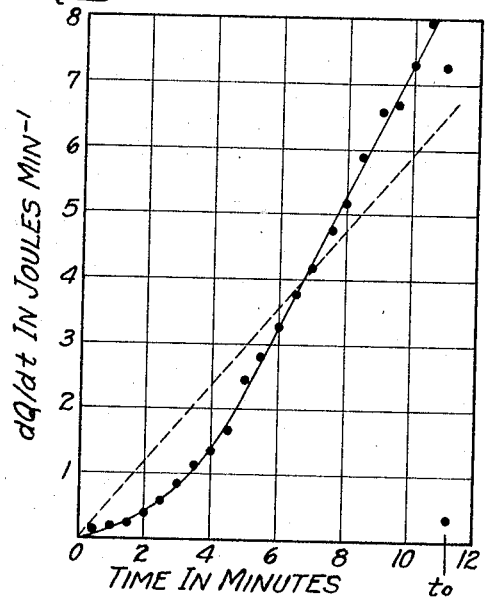
FIG. 7 is a similar representation to that of FIG. 5 but for the fusion of aluminum.

Further demonstrations of the usefulness of the apparatus of the present invention have been made by the recording of $dQ/dt$ as a function of time, thereby actually monitoring the kinetics of endothermic and exothermic processes in a manner that has not previously been feasible. FIGURES 5, 6 and 7, discussed below, illustrate some of the results of such analysis. The parameter $dQ/dt$ is more sensitive than $\Delta Q$ in its response to changes in variables such as the thermal inertia of the system and various types of thermal barriers.

It is to be noted that the results were found to be independent of the following variables, at least within the limits shown in Table I or indicated hereinabove and in our article: (a) amount of sample; (b) sample preparation and initial state; (c) material and internal geometry of container; (d) level of power input to the auxiliary heater; (e) pressure of the argon atmosphere; (f) heating rate provided by the external furnace.

Due to supercooling, all substances in Table I froze at rates too high for manual compensation. This tendency was arrested in the case of Pb by using a container of pure Ni. The heat of crystallization found for this sample was within 1% of its heat of fusion. For these exothermic experiments the initial constant input to the sample heater was 0.1174 watt. The E.M.F. output of the reference thermocouple was proportionally increased to that equivalent to the E.M.F. of the sample thermocouple either by supplying an external constant E.M.F. or by utilizing a reference heater. In the apparatus discussed in the examples, a heater was present at the reference material due to the fact that both reference and sample structures were constructed identically for interchangeability. It is readily apparent to those skilled in the art that a sample structure normally comprises a reference structure. The sample structure can often be constructed equivalent to the reference structure.

where $\Delta H$=energy (calories) required to fuse the particular sample in question. For a balanced sample structure $dH/dt=k(T_h-T_m)$. If a linear heating rate $A$ is provided by the external furnace, $T_h-T_m=At$, wherein $t$=time. Combining the last three equations results in $dn/dt=(kA/\Delta H)t$ and $dH/dt=kAt$. The last equation upon integration yields $k=2\Delta H/At_o^2$ or $$\frac{dH}{dt} = \frac{2\Delta H}{t_o^2} \cdot t$$

where $t_o$ is the total time required for the fusion. Accordingly, if $dH/dt=dQ/dt$, that is if the kinetics of the process can be described by the quantitative-differential-thermal-analysis process hereinabove described, a plot of the experimental $dQ/dt$ as a function of time should prove to be a straight line with origin at zero and slope equal to $2\Delta H/t_o^2$. FIG. 5 for Sn shows that this is so. The same result is also obtained with Pb and Ag. In FIGS. 5, 6 and 7, the rate of electrical energy input to the sample heater is portrayed as a function of time. The points were experimentally determined; the dashed lines are theoretical with slope equal to $2\Delta H/t_o^2$ for a zero-order kinetic process. The experimental rates of heat input $dQ/dt$ into the auxiliary heater was determined by displaying, on a high-speed recorder, the on-off periods during manual switching. The energy $Q$ for each 0.5-min. interval of the fusion period then was plotted appropriately as $dQ/dt$ vs. $t$ to give the experimental points on the plots. The melting behavior of sodium nitrate and, surprisingly, aluminum were found to be complex and not those of a zero-order process. The fusion of sodium nitrate is illustrated in FIG. 6 and the fusion of aluminum is depicted in FIG. 7. In both instances the linear behavior is preceded by an exponential dependence of $dQ/dt$ on $t$. In previous work such lambda-type melting behavior of $NaNO_3$ has been indicated and the present work confirms those results.

We have found that the energy involved in the lambda-type premelting phenomenon of aluminum amounts to 3.5% of the total. So far as we are aware, such lambda-type premelting of aluminum has not previously been recognized, and its identification and analysis may not be feasible if at all possible by techniques other than the use of quantitative differential thermal analysis. In addition, uniformity and accuracy over a broad range of temperatures and materials in quantitative differential thermal analysis are considered to be novel contributions of the present invention.

The flexibility of the invention is further illustrated by experiments involving exothermic processes in which the sample experiences changes in mass. Table II below presents data obtained from such an experiment involving the reaction of $CO_2$ and $CaO$ at various temperatures. The values found are within the limits of uncertainty set by the critical literature.

TABLE II.—DETERMINATION OF THE HEAT OF THE REACTION

[$CaO(c.) + CO_2(g.) \rightarrow CaCO_3(c.)$]

| CaO Mass in g. | $CO_2$ Absorbed Mass in g. | Temp. of Reaction in °K. | Joules | $\Delta H_T$, cal./mole | $\Delta H_{298}$, cal./mole |
|---|---|---|---|---|---|
| .0627₅ | .0057₉ | 722.3 | 22.70 | 41,219 | 41,870 |
| .0571₇ | .0071₉ | 742.5 | 28.61 | 41,806 | 42,506 |
| .0492₅ | .0042₈ | 781.6 | 17.25 | 42,374 | 43,174 |
| .0492₅ | .0058₇ | 784.1 | 22.92 | 41,051 | 41,851 |
| .0492₅ | .0068₃ | 816.0 | 26.76 | 41,192 | 42,092 |
| .0492₅ | .0067₅ | 821.6 | 27.04 | 42,117 | 43,017 |

Mean $\Delta H_{298}$ and range _____ 42,418 Cal./mole
(41,851–43,174)
$\Delta H_{298}$ in K. K. Kelley, U.S. Bur. Mines Bull. No. 384 _____ 42,490
$\Delta H_{298}$ from O. Kubaschewski and E. I. Evans, "Metallurgical Thermochemistry", Pergamon Press, N.Y. 1958 ____ 42,850±1,210

The above examples are provided merely for illustration of the invention and should not be interpreted as establishing limitations. The scopes of the invention are defined in the following claims.

What we claim as new and desire to secure by Letters Patent of the United States is:

1. An apparatus of a differential-thermal-analysis type comprising:
   reference means;
   means for holding a sample material;
   an auxiliary heater acting on said sample material;
   means for maintaining a constant temperature relation between said reference means and said sample material, said means including means responsive to the temperature of said sample material;
   means for maintaining a constant relation between heat loss from said auxiliary heater and heat gain to said sample material, said means including means resistant to the flow of heat disposed within said auxiliary heater and between said sample material and said means responsive to the temperature of said sample material, the heat transfer characteristics of said means resistant to the flow of heat having been adjusted in accordance with calibration of the apparatus so that said characteristics will permit the correct determination of ΔH for a sample material; and
   means for recording the energy input to said auxiliary heater.

2. An apparatus of claim 1 including means to maintain a constant relation between the instantaneous heat loss from said auxiliary heater and the instantaneous heat gain to said sample material.

3. An apparatus for quantitatively determining ΔH and $dH/dt$ as a function of time for exothermic and endothermic processes in a sample material by differential-thermal-analysis means, said apparatus comprising:
   reference means;
   means for holding said sample material;
   an external heater acting in quantitatively constant relation on both said reference means and said sample material;
   an auxiliary heater acting on said sample material;
   temperature measuring means so positioned as to communicate information on the effective difference in temperature between said reference means and said sample material, at least part of said temperature measuring means being responsive to the temperature of said sample material;
   means to keep the temperatures of said reference material and said sample material in a quantitatively constant relation including feed-back means making use of said information to control the energy input into said auxiliary heater;
   means to maintain the heat gain to said sample material in a quantitatively constant relation to the heat loss of said auxiliary heater, said means including a heat barrier of finite thickness disposed within said auxiliary heater and between said sample material and the part of said temperature measuring means responsive to the temperature of said sample material, the heat transfer characteristics of said heat barrier having been adjusted in accordance with calibration of the apparatus so that said characteristics will permit the correct determination of ΔH for a sample material; and
   means for recording said energy input into said auxiliary heater continuously as a function of time.

4. An apparatus of claim 3 including means to maintain a constant relation between the instantaneous heat loss from said auxiliary heater and the instantaneous heat gain to said sample material.

5. An apparatus for quantitatively determining ΔH and $dH/dt$ as a function of time for exothermic and endothermic processes in a sample material by differential-thermal-analysis means, said apparatus comprising:
   reference means;
   means for holding said sample material;
   an external heater acting in quantitatively constant relation on both said reference means and said sample material;
   an auxiliary heater substantially enclosing and acting on said sample material;
   a differential thermocouple comprising two thermocouples, specifically a reference thermocouple responsive to the temperature of said reference means and a sample thermocouple responsive to the temperature of said sample material, with a leg of one of said thermocouples electrically connected to a leg of like polarity of the other of said thermocouples, said sample thermocouple being enclosed by said auxiliary heater;
   means to maintain a constant relation between the temperatures of said reference means and said sample material while said external heater increases the temperature of both said reference means and said sample material including the time during which said endothermic and exothermic processes occur, including freed-back means utilizing the output of said differential thermocouple to control the energy input to said auxiliary heater;
   a heat barrier of finite thickness disposed within said auxiliary heater and between said sample material and said sample thermocouple, the thickness of said heat barrier having been determined by calibration of the apparatus as that thickness which will permit the correct determination of ΔH for a sample material; and
   means for recording the energy input into said auxiliary heater as a function of time to allow a thermodynamic determination of ΔH and a kinetic determination of $dH/dt$ for the endothermic and exothermic processes experienced by said sample material.

6. An apparatus of claim 5 including means to maintain a constant relation between the instantaneous heat loss from said auxiliary heater and the instantaneous heat gain to said sample material.

7. The apparatus of claim 6 in which said sample material is enclosed in a container which is coaxial with and inside of said auxiliary heater and is on the opposite side of said heat barrier from said sample thermocouple, and in which said container comprises an outer wall and a center post thereby disposing said sample material in an annular geometry about said center post, said sample thermocouple being centered within said auxiliary heater.

(References on following page)

References Cited by the Examiner

UNITED STATES PATENTS 3,263,484   8/1966   Watson et al. _____ 73—15

FOREIGN PATENTS 1,253,722   1/1961   France.

OTHER REFERENCES

Clarebrought, L. M. et al.: "The Determination of the Energy Stored in a Metal During Plastic Deformation." In Proceedings of The Royal Society of London, pp. 507–524, November-December 1952.

Charuel, R. et al.: "Study of Differential Microcalorimetry Stability." In Journal De Chemie Physique. 52(6): pp. 441–446, QD1J6, June 1955.

References Cited by the Applicant

Charles Eyraud: Appareil d'analyse enthalpique différentielle, Comptes Rendus, vol. 238, pp. 1511–1512, January-June 1954.

F. E. Wittig: Uber eine Methode zur direkten Messung von Schmelzwärmen bei höheren Temperaturen, Zeithschrift für Elektrochemie, vol. 54, July 1950, pp. 288–294.

RICHARD C. QUEISSER, *Primary Examiner.*

J. C. GOLDSTEIN, *Assistant Examiner.*